US012801320B2

(12) United States Patent
Kondo

(10) Patent No.: US 12,801,320 B2
(45) Date of Patent: Nov. 17, 2026

(54) INFORMATION PROCESSING SYSTEM AND NON-TRANSITORY COMPUTER-READABLE STORAGE MEDIUM STORING INFORMATION PROCESSING PROGRAM

(71) Applicant: FUJIFILM Business Innovation Corp., Tokyo (JP)

(72) Inventor: Makoto Kondo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/591,070

(22) Filed: Feb. 29, 2024

(65) Prior Publication Data

US 2025/0021279 A1 Jan. 16, 2025

(30) Foreign Application Priority Data

Jul. 11, 2023 (JP) ................................. 2023-114078

(51) Int. Cl.
*G06F 3/12* (2006.01)

(52) U.S. Cl.
CPC ............ *G06F 3/126* (2013.01); *G06F 3/1204* (2013.01)

(58) Field of Classification Search
None
See application file for complete search history.

(56) References Cited

U.S. PATENT DOCUMENTS

| | | | | |
|---|---|---|---|---|
| 9,274,726 | B2 | 3/2016 | Ito | |
| 2017/0242640 | A1* | 8/2017 | Yamaguchi | G06F 3/1229 |
| 2022/0027100 | A1* | 1/2022 | Abe | G06F 3/126 |

FOREIGN PATENT DOCUMENTS

| | | |
|---|---|---|
| JP | 2015-106798 A | 6/2015 |

* cited by examiner

*Primary Examiner* — Frantz Bataille
(74) *Attorney, Agent, or Firm* — Oliff PLC

(57) ABSTRACT

An information processing system includes a processor, wherein the processor performs processing of: receiving a print request including print information of a print target from an information processing apparatus that has acquired the print request from a print management system; and rejecting acceptance of the print request from another user when a notification indicating that there is the print request that is a subsequent print request that has not been received from the print management system is received from the information processing apparatus.

6 Claims, 10 Drawing Sheets

INFORMATION PROCESSING SYSTEM AND NON-TRANSITORY COMPUTER-READABLE STORAGE MEDIUM STORING INFORMATION PROCESSING PROGRAM

CROSS-REFERENCE TO RELATED APPLICATIONS

This application is based on and claims priority under 35 USC 119 from Japanese Patent Application No. 2023-114078 filed Jul. 11, 2023.

BACKGROUND

(i) Technical Field

The present disclosure relates to an information processing system and a non-transitory computer-readable storage medium storing an information processing program.

(ii) Related Art

JP2015-106798A proposes a printing apparatus that has a communication function, is capable of exclusively switching between a wired connection and a connection with Wi-Fi Direct, transmits a temporary detachment notification to a device connected to a wired LAN before switching the connection from the wired LAN to Wi-Fi Direct, and transmits a recovery notification from temporary detachment to the device connected to the wired LAN after switching the connection from Wi-Fi Direct to the wired LAN.

SUMMARY

It is conceivable to register a print request in a print management system, transmit the print request from the print management system to an information processing apparatus, and transmit the print request to an image forming apparatus via the information processing apparatus. In this case, when the free space of the information processing apparatus is insufficient as compared with the size of the print request, the information processing apparatus needs to repeatedly perform an operation of receiving the print request from the print management system and an operation of transmitting the print request to the image forming apparatus. If printing is instructed by another user during the reception operation, the image forming apparatus performs printing, and the printed matter of the other user may be mixed in the discharge tray.

Aspects of non-limiting embodiments of the present disclosure relate to an information processing system capable of performing printing without mixing a printed matter of another user when a print request is transmitted from a print management system to an information processing apparatus and the print request is transmitted to an image forming apparatus via the information processing apparatus, and a non-transitory computer-readable storage medium storing an information processing program.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising a processor, wherein the processor performs processing of:

receiving a print request including print information of a print target from an information processing apparatus that has acquired the print request from a print management system; and rejecting acceptance of the print request from another user when a notification indicating that there is the print request that is a subsequent print request that has not been received from the print management system is received from the information processing apparatus.

BRIEF DESCRIPTION OF THE DRAWINGS

Exemplary embodiments of the present invention will be described in detail based on the following figures, wherein.

DETAILED DESCRIPTION

Figure 1:
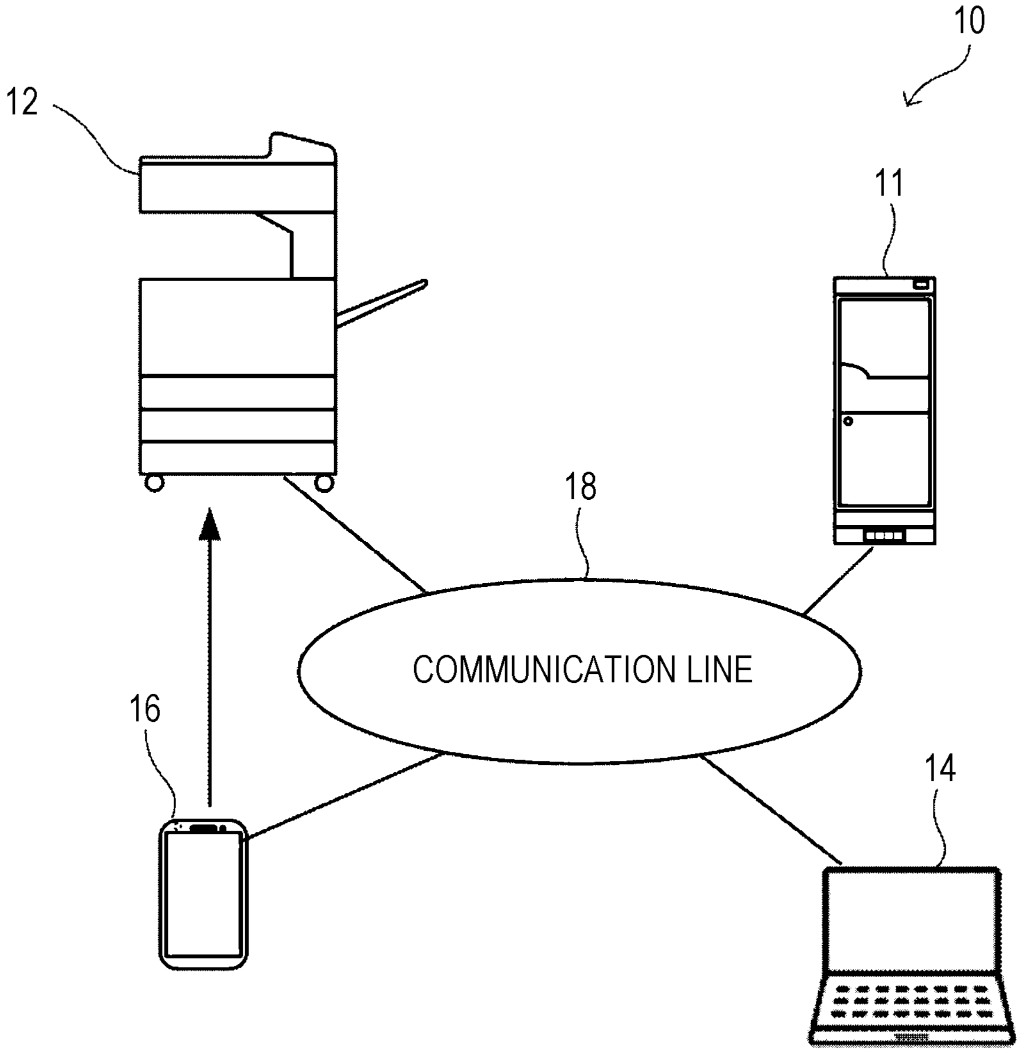
FIG. 1 is a diagram illustrating a schematic configuration of an information processing system according to an exemplary embodiment.

Hereinafter, an example of the exemplary embodiment will be described in detail with reference to the drawings. In the exemplary embodiment, an information processing system in which a cloud server 11, an image forming apparatus, a client computer, a mobile terminal, and the like are connected to each other via a communication line such as various networks will be described as an example. FIG. 1 is a diagram illustrating a schematic configuration of an information processing system 10 according to the exemplary embodiment.

As illustrated in FIG. 1, the information processing system 10 according to the exemplary embodiment includes the cloud server 11, an image forming apparatus 12, a client computer 14, and a mobile terminal 16 as an example of an information processing apparatus. The cloud server 11, the image forming apparatus 12, and the client computer 14 are connected to each other via a communication line 18 such as a local area network (LAN), a wide area network (WAN), the Internet, or an intranet. The cloud server 11, the image forming apparatus 12, the client computer 14, and the mobile terminal 16 can transmit and receive various data to and from each other via the communication line 18. In the exemplary embodiment, when the client computer 14 or the mobile terminal 16 instructs the image forming apparatus 12 to perform printing via the cloud server 11, the image forming apparatus 12 forms an image corresponding to the print instruction.

Although one cloud server 11, one image forming apparatus 12, one client computer 14, and one mobile terminal 16 are illustrated in FIG. 1, the number of each of them may be two or more, or the number of some of them may be two or more. In the information processing system 10 according to the exemplary embodiment, in addition to a print instruction from the mobile terminal 16 via the communication line 18, it is also possible to issue a print instruction via short-range wireless communication such as Wi-Fi (registered trademark) or Bluetooth (registered trademark). As the mobile terminal 16, for example, a mobile phone such as a smartphone, a personal digital assistant (PDA), a laptop personal computer, or the like is applied.

The image forming apparatus 12 according to the exemplary embodiment has a plurality of functions such as an image forming function of performing image formation processing, a reading function of reading a document to obtain image information representing the document, a copying function of copying an image recorded on the document onto a sheet, a facsimile function of transmitting and receiving various data via a telephone line (not illustrated), a transfer function of transferring document information such as the image information read by the reading function or the like, and a storage function of storing document information such as the read image information. The plurality of functions may include all of these functions or may include two or more of these functions.

Figure 2:
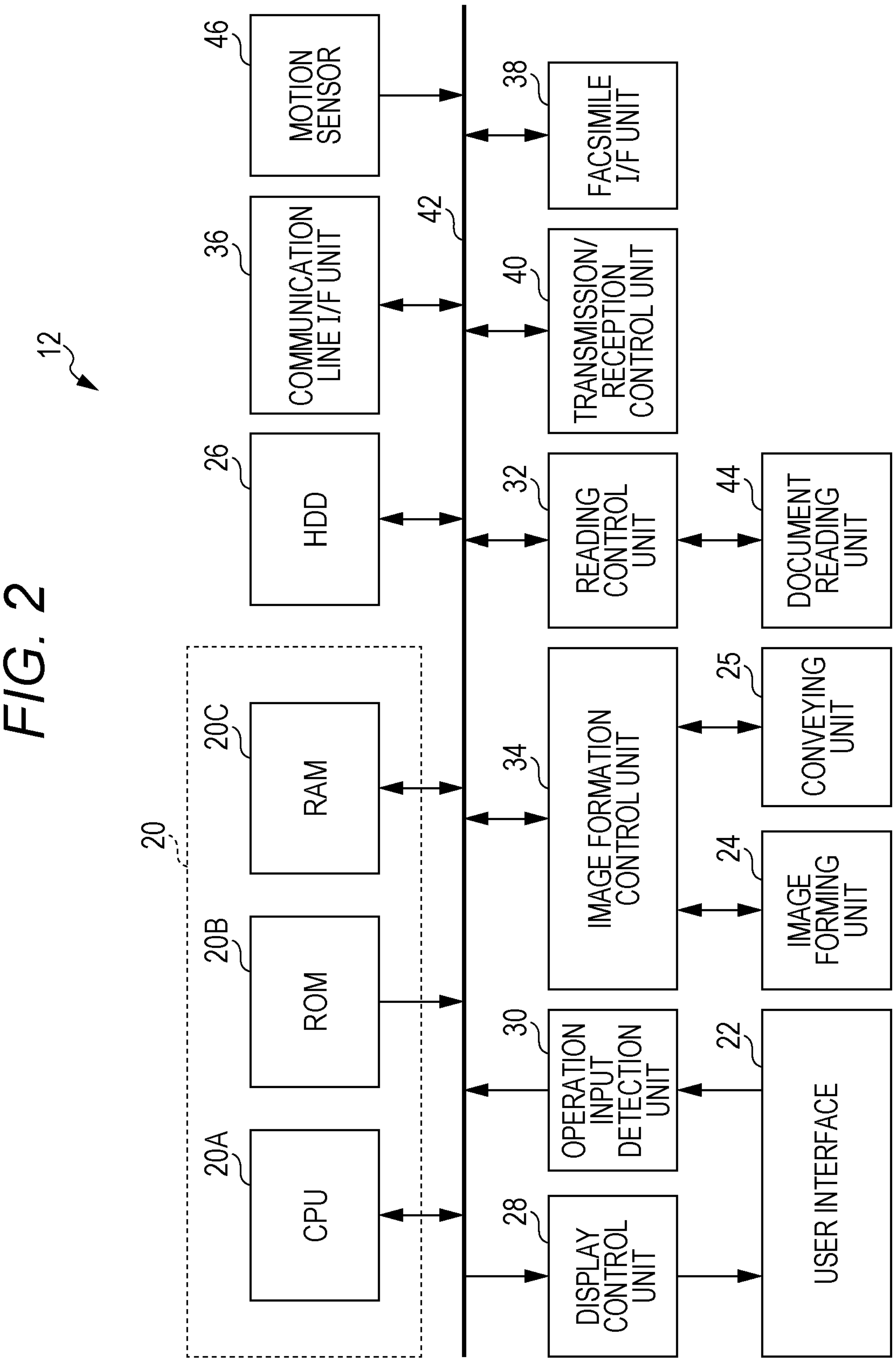
FIG. 2 is a block diagram illustrating a configuration of main parts of an electrical system of an image forming apparatus in the information processing system according to the exemplary embodiment.

FIG. 2 is a block diagram illustrating a configuration of main parts of an electrical system of the image forming apparatus 12 in the information processing system 10 according to the exemplary embodiment.

As illustrated in FIG. 2, the image forming apparatus 12 according to the exemplary embodiment includes a control unit 20 including a central processing unit (CPU) 20A, a read only memory (ROM) 20B, and a random access memory (RAM) 20C. The CPU 20A is responsible for the overall operation of the image forming apparatus 12. The RAM 20C is used as a work area or the like at the time of execution of various programs with the CPU 20A. Various information processing programs such as an application program, various parameters, and the like are stored in advance in the ROM 20B. In the image forming apparatus 12, the units of the control unit 20 are electrically connected to each other by a system bus 42.

On the other hand, the image forming apparatus 12 according to the exemplary embodiment includes a hard disk drive (HDD) 26 that stores various data, application programs, and the like. The image forming apparatus 12 also includes a display control unit 28 that is connected to a user interface 22 and controls display of various operation screens and the like on a display of the user interface 22. The image forming apparatus 12 also includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. Although the HDD 26 is applied as a storage unit in the image forming apparatus 12 according to the exemplary embodiment, the storage unit is not limited to the HDD 26, and a non-volatile storage unit such as a flash memory may be applied. In the exemplary embodiment, a touch panel capable of display and operation input is applied as the user interface 22. However, the user interface is not limited to the touch panel, and a user interface including a display and an operation unit different from each other may be applied.

The image forming apparatus 12 according to the exemplary embodiment includes a reading control unit 32 that controls an optical image reading operation with a document reading unit 44 and a document feeding operation with a document conveying unit, and an image formation control unit 34 that controls image forming processing with an image forming unit 24 and conveyance of a sheet to the image forming unit 24 with a conveying unit 25. The image forming apparatus 12 also includes a communication line I/F (interface) unit 36 that is connected to the communication line 18 and transmits and receives communication data to and from another external device such as the client computer 14 connected to the communication line 18. The image forming apparatus 12 also includes a facsimile I/F (interface) unit 38 that is connected to a telephone line (not illustrated) and transmits and receives facsimile data to and from a facsimile machine connected to the telephone line. The image forming apparatus 12 also includes a transmission/reception control unit 40 that controls transmission and reception of facsimile data via the facsimile I/F unit 38. The image forming apparatus 12 also includes a motion sensor 46 that detects a person around the apparatus. In the image forming apparatus 12, the transmission/reception control unit 40, the reading control unit 32, the image formation control unit 34, the communication line I/F unit 36, the facsimile I/F unit 38, and the motion sensor 46 are electrically connected to the system bus 42.

With the above-described configuration, the image forming apparatus 12 according to the exemplary embodiment causes the CPU 20A to access each of the RAM 20C, the ROM 20B, and the HDD 26. The image forming apparatus 12 causes the CPU 20A to execute control of display of information such as an operation screen and various messages on the display of the user interface 22 via the display control unit 28. The image forming apparatus 12 causes the CPU 20A to execute control of the operations of the document reading unit 44 and the document conveying unit via the reading control unit 32. The image forming apparatus 12 also causes the CPU 20A to execute each of control of the operations of the image forming unit 24 and the conveying unit 25 via the image formation control unit 34 and control of communication data transmission and reception via the communication line I/F unit 36. The image forming apparatus 12 also causes the CPU 20A to execute control of facsimile data transmission and reception via the facsimile I/F unit 38 with the transmission/reception control unit 40. Further, the image forming apparatus 12 causes the CPU 20A to grasp the operation content in the user interface 22 based on the operation information detected by the operation input detection unit 30 and execute various types of control based on the operation content.

Figure 3:
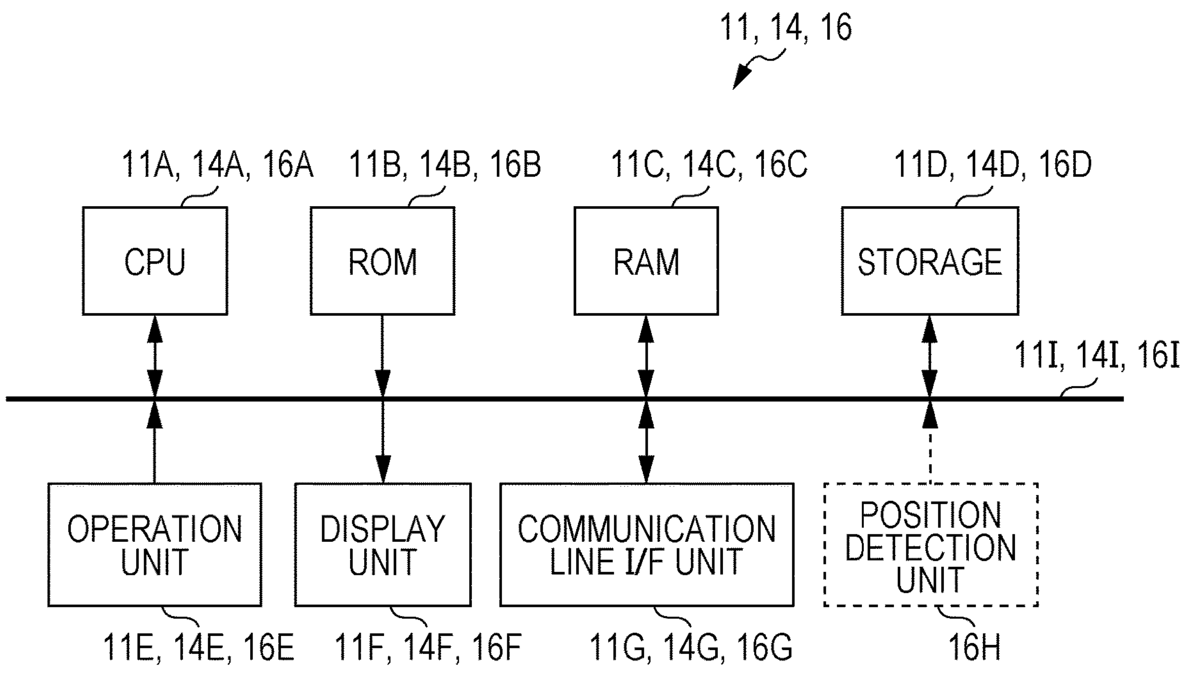
FIG. 3 is a block diagram illustrating a configuration of main parts of an electrical system of a cloud server, a client computer, and a mobile terminal in the information processing system according to the exemplary embodiment.

Next, a configuration of main parts of an electrical system of the cloud server 11, the client computer 14, and the mobile terminal 16 according to the exemplary embodiment will be described. FIG. 3 is a block diagram illustrating a configuration of main parts of the electrical system of the cloud server 11, the client computer 14, and the mobile terminal 16 in the information processing system 10 according to the exemplary embodiment. Since the cloud server 11, the client computer 14, and the mobile terminal 16 have a typical computer configuration, the cloud server 11 will be described below as a representative.

As illustrated in FIG. 3, the cloud server 11 according to the exemplary embodiment includes a CPU 11A as an example of a processor, a ROM 11B, a RAM 11C, a storage 11D, an operation unit 11E, a display unit 11F, and a communication line I/F (interface) unit 11G. The CPU 11A is responsible for the overall operation of the cloud server 11. The ROM 11B stores various control programs, various parameters, and the like in advance. The RAM 11C is used as a work area or the like when various programs are executed by the CPU 11A. The storage 11D stores various types of data, application programs, and the like. The operation unit 11E is used to input various types of information. The display unit 11F is used to display various types of information. The communication line I/F unit 11G is connected to the communication line 18 and performs transmission and reception of various types of data to and from other devices connected to the communication line 18. The communication line I/F unit 11G may be configured to be able to directly communicate with each device using various well-known wireless communications. The units of the cloud server 11 described above are electrically connected to each other by a system bus 11I. In the cloud server 11 according to the exemplary embodiment, the storage 11D is used as a storage unit. As an example of the storage, a non-volatile storage unit such as a hard disk drive (HDD) or a flash memory is used.

With the above-described configuration, the cloud server 11 according to the exemplary embodiment causes the CPU 11A to execute each of access to the ROM 11B, the RAM 11C, and the storage 11D, acquisition of various types of information via the operation unit 11E, and display of various types of information on the display unit 11F. The cloud server 11 also causes the CPU 11A to execute control of communication data transmission and reception via the communication line I/F unit 11G.

The mobile terminal 16 includes a position detection unit 16H that detects the position of the mobile terminal 16 using a global positioning system (GPS) or the like, and an imaging unit (not illustrated) such as a camera, as components that are not included in the cloud server 11.

In the information processing system 10 according to the exemplary embodiment configured as described above, the cloud server 11 provides, as a cloud service, a print management system that performs predetermined specific processing on a print job and performs printing with the image forming apparatus 12. Examples of the specific processing include history management processing of managing a history of print jobs, approval processing of performing approval for a print job, and confidential processing of performing mask processing or the like on a confidential portion of a print job. In the print management system, for example, the cloud server 11 accepts a print job from the client computer 14, performs approval processing on the accepted print job, and transmits the approved print job to the image forming apparatus 12. This causes only the approved print job to be printed by the image forming apparatus 12. The print job refers to processing or a collection of processing to be executed by the image forming apparatus 12 for executing printing.

However, in a case where printing is performed by the image forming apparatus 12 that is not connected to the information processing system 10 or is not permitted to be connected to the information processing system 10, the specific processing provided by the information processing system 10 cannot be used.

Therefore, the information processing system 10 according to the exemplary embodiment performs processing of accepting a print job as a print request including print information to be printed, executing predetermined specific processing on the print information included in the accepted print job, and transmitting the print job including the print information after the execution of the specific processing to the image forming apparatus 12 or the mobile terminal 16 that is registered in advance.

Figure 4:
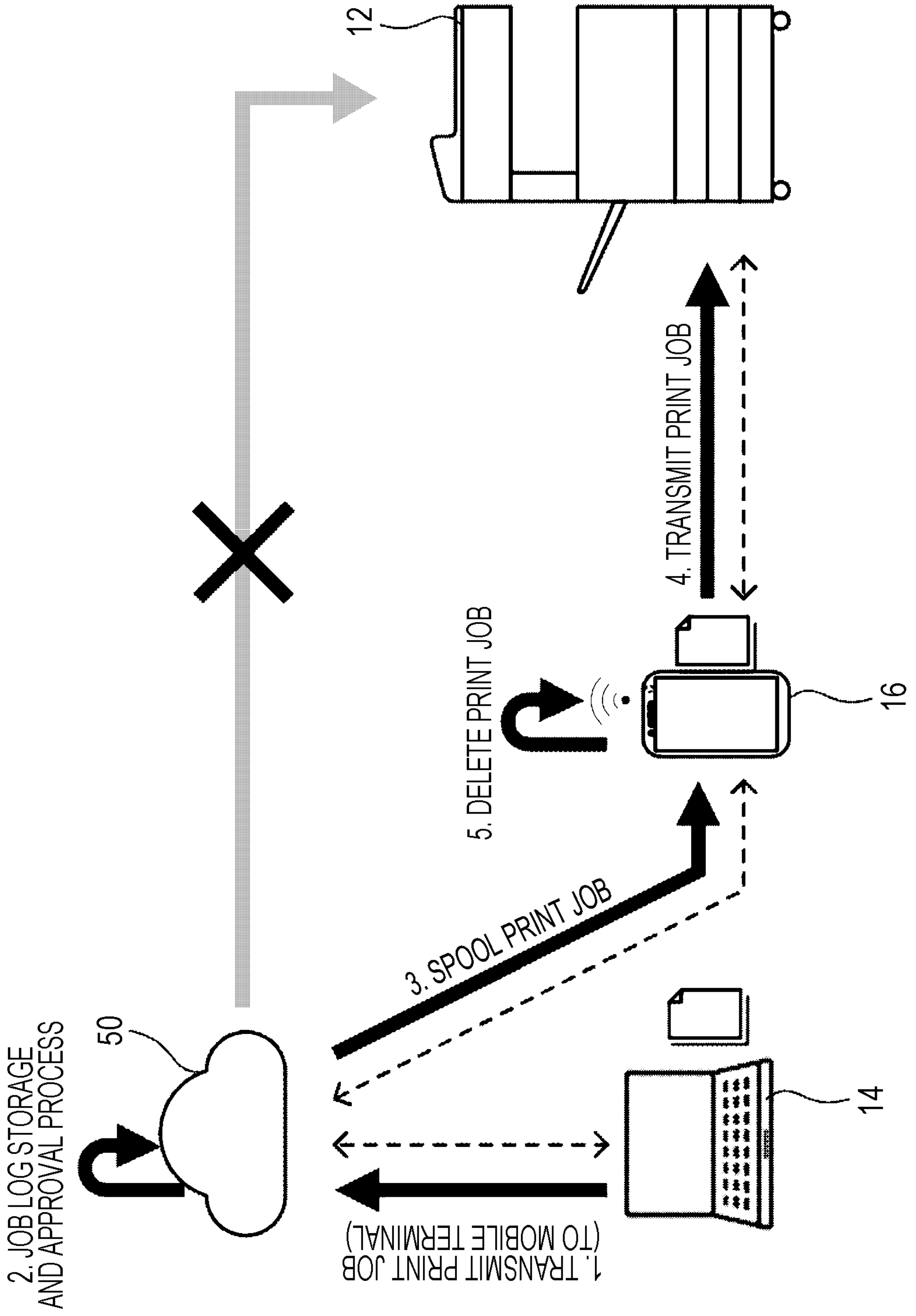
FIG. 4 is a diagram illustrating an outline of processing performed in the information processing system according to the exemplary embodiment.

Specifically, as illustrated in FIG. 4, a print job is transmitted from the client computer 14 to a print management system 50 on the cloud with the mobile terminal 16 as a destination. FIG. 4 is a diagram illustrating an outline of processing performed in the information processing system 10 according to the exemplary embodiment.

Upon accepting a print job from the client computer 14, the print management system 50 stores a job log for managing a history as specific processing and performs approval processing for printing. The approval processing is performed by, for example, requesting the client computer 14 registered in advance to approve printing of the print job and receiving an approval result.

Subsequently, the print management system 50 transmits the print job after the specific processing to the mobile terminal 16 that is a destination specified by the client computer 14 and spools the print job in the mobile terminal 16. The spooling does not mean that the print information is directly transmitted to the image forming apparatus 12, but means that the print information is temporarily stored in another place. The print job to be spooled includes "print information" and "attribute information of print information", which are collectively referred to as "print job". The attribute information includes print setting information managed separately from the print information and an expiration date of the print job.

Then, the print job is transmitted from the mobile terminal 16 to the image forming apparatus 12 using short-range wireless communication, whereby the print job after the specific processing is printed by the image forming apparatus 12. This configuration causes the image forming apparatus 12 to perform printing using the specific processing provided by the information processing system 10 even when the image forming apparatus 12 is not connected to the information processing system or is not permitted to be connected to the information processing system. In the exemplary embodiment, a description will be given on the assumption that a print job is transmitted from the mobile terminal 16 to the image forming apparatus 12 through short-range wireless communication, but the present invention is not limited to short-range wireless communication, and the print job may be transmitted through connection to the communication line 18 or through a wired connection.

In the information processing system 10 according to the exemplary embodiment, to spool a print job in the mobile terminal 16, the mobile terminal 16 needs to repeatedly perform an operation of receiving the print job from the print management system 50 and an operation of transmitting the print job to the image forming apparatus 12 when the free space of the mobile terminal 16 is insufficient in comparison with the size of the print job.

Here, in a case where the image forming apparatus 12 is set to output a print request as it is when receiving the print request, if printing is instructed from another user while the mobile terminal 16 is performing a receiving operation, the image forming apparatus 12 performs printing and printed matters of the other user are mixed in the discharge tray.

Thus, when the information processing system 10 according to the exemplary embodiment receives a print job from the mobile terminal 16 that has acquired the print job including print information of a print target from the print management system 50 and receives, from the mobile terminal 16, a notification indicating that there is a subsequent print job that has not been received from the print management system 50, the information processing system 10 performs processing of rejecting acceptance of a print job from another user.

Specifically, when there is a subsequent print job that has not been received from the print management system 50 at the end of transmission of print data from the mobile terminal 16 to the image forming apparatus 12, the mobile terminal 16 notifies the image forming apparatus 12 that there is a subsequent print job. Then, the image forming apparatus 12 stops accepting a print job from another user. This prevents the output of another user from mixing in the printed result. In the following description, it is assumed that the image forming apparatus 12 is set to output a print request as it is when receiving the print request.

More specifically, the mobile terminal 16 switches between a "connection to cloud service" mode and a "connection to the image forming apparatus 12" mode, receives a print job from the cloud server 11, and transfers data to the image forming apparatus 12. For example, the mobile terminal 16 acquires a print job from the print management system 50 by using a first communication such as Wi-Fi or a mobile phone line as the "connect to cloud service" mode. The mobile terminal 16 transmits the print job to the image forming apparatus 12 by using a second communication different from the first communication. As an example of the second communication, short-range wireless communication such as Wi-Fi Direct or BLUETOOTH (registered trademark) is used. The first communication and the second communication are set to be exclusive and are used by switching.

When there is no free space for receiving all print jobs from the cloud server 11, the mobile terminal 16 repeats reception from the cloud server 11 and transmission to the image forming apparatus 12.

When switching to the mode for connecting to the cloud service after transmitting data to the printer, the mobile terminal 16 notifies the image forming apparatus 12 that "there is a next print job" to be received from the cloud server 11 and sent to the image forming apparatus 12.

When the image forming apparatus 12 receives a notification that "there is a next print job" through short-range wireless communication such as Wi-Fi Direct, the image forming apparatus 12 rejects a print request from another client and does not accept printing until the print job is processed.

Figure 5:
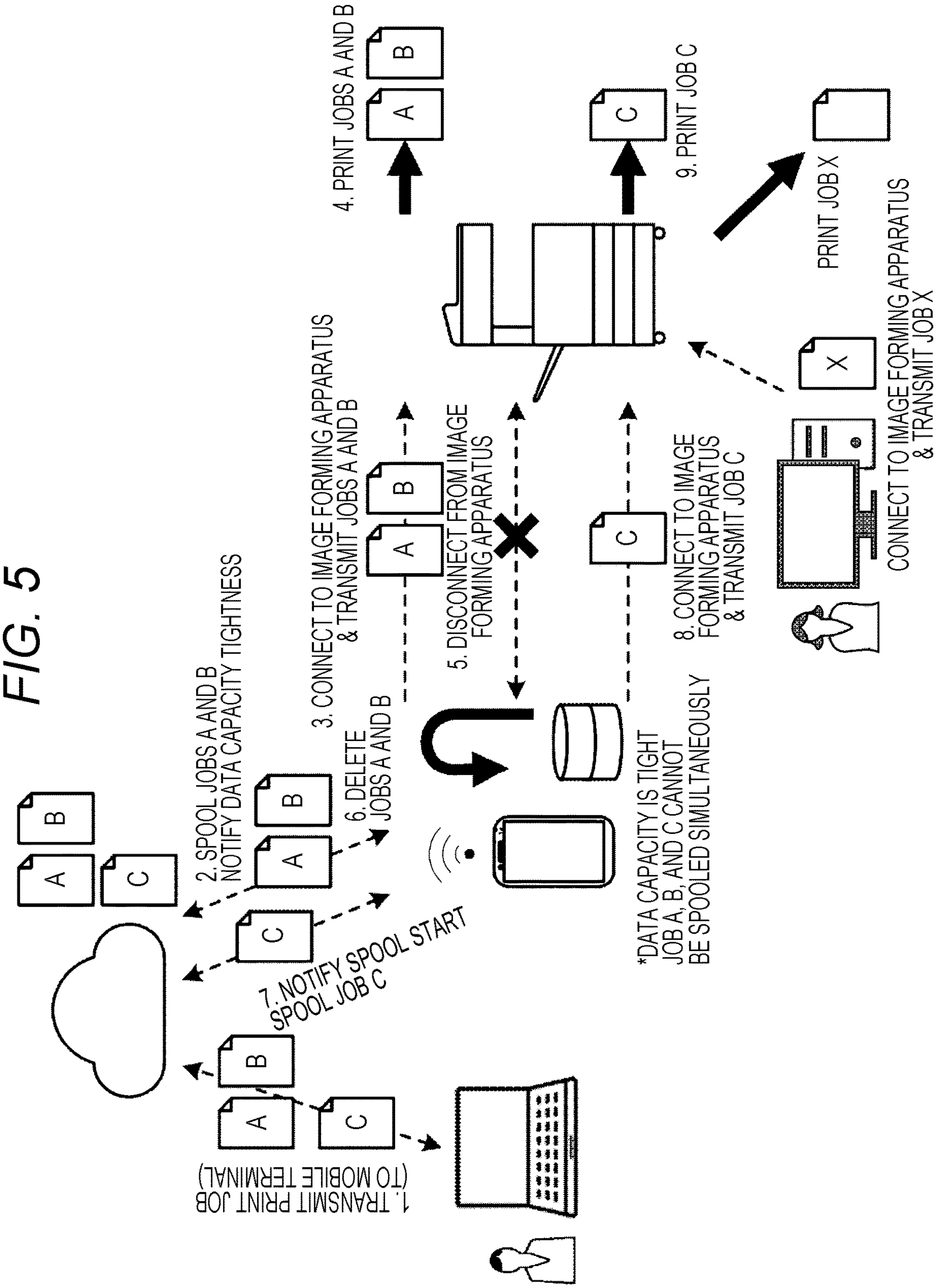
FIG. 5 is a diagram for describing a specific example of processing performed in the information processing system according to the exemplary embodiment.

Here, the processing performed in the information processing system 10 according to the exemplary embodiment will be described with a specific example. FIG. 5 is a diagram for describing a specific example of processing performed in the information processing system 10 according to the exemplary embodiment.

1. A user operates the client computer 14 to transmit print jobs to the print management system 50. For example, the print jobs are transmitted to and registered in the print management system 50 with the mobile terminal 16 registered in advance as a spool destination. In the example of FIG. 5, an example in which print jobs ABC are transmitted to the print management system 50 is illustrated.
2. The print management system 50 receives the print jobs and notifies the specified mobile terminal 16 that is the spool destination of the presence of the print jobs. The mobile terminal 16 that has received the notification checks the space of the own device and determines whether all the print jobs can be received. When all the print jobs can be received, a transmission request for all the print jobs is sent to the print management system 50. When all the print jobs cannot be received, a transmission request for receivable print jobs is sent to the print management system 50. In the example of FIG. 5, an example in which a transmission request for the print jobs AB is sent to the print management system 50 and received is illustrated.
3. Upon receiving the print jobs AB, the mobile terminal 16 switches to short-range wireless communication to connect to the image forming apparatus 12, and a user operates the mobile terminal 16 to transmit the print jobs to the image forming apparatus 12 and instruct printing. In the example of FIG. 5, an example of transmitting the print jobs AB from the mobile terminal 16 to the image forming apparatus 12 is illustrated. Here, the mobile terminal 16 notifies the image forming apparatus 12 that there is a next subsequent print job C.
4. Upon receiving the print jobs AB, the image forming apparatus 12 performs printing. Here, upon completion of printing, the image forming apparatus 12 deletes or stores the data of the print jobs AB. When the image forming apparatus 12 is notified by the mobile terminal 16 that there is a subsequent print job, the image forming apparatus 12 rejects a print request from another user.
5. Upon ending of the transmission of the print jobs to the image forming apparatus 12, the mobile terminal 16 cut the connection with the image forming apparatus 12 through short-range wireless communication and connects to the print management system 50.
6. The mobile terminal 16 deletes the print jobs AB spooled therein so that the print job C can be accepted.
7. When the print jobs spooled in the mobile terminal 16 is deleted and the notification of the spool start is received from the mobile terminal 16, the print management system 50 transmits the print job C to the mobile terminal 16 and spools the print job C in the mobile terminal 16.
8. Upon receiving the print job C, the mobile terminal 16 switches to short-range wireless communication to connect to the image forming apparatus 12 and transmits the print job C to the image forming apparatus 12.

9. Upon receiving the print job C, the image forming apparatus 12 performs printing. Here, upon completion of printing, the image forming apparatus 12 deletes the data of the print jobs ABC. In a case where a print request from another user is rejected in 4, the print request is permitted after printing of the print job C is completed.

In addition, upon ending of the transmission of the print job C to the image forming apparatus 12, the mobile terminal 16 cut the connection with the image forming apparatus 12 through short-range wireless communication and connects to the print management system 50. Then, the mobile terminal 16 deletes the job C spooled therein so that the mobile terminal 16 can accept future print jobs.

When the print request is permitted, the other user connects to the image forming apparatus 12 and transmits a job X to the image forming apparatus 12, and printing is performed by the image forming apparatus 12.

Next, specific processing performed in the information processing system 10 according to the exemplary embodiment configured as described above will be described.

Figure 6:
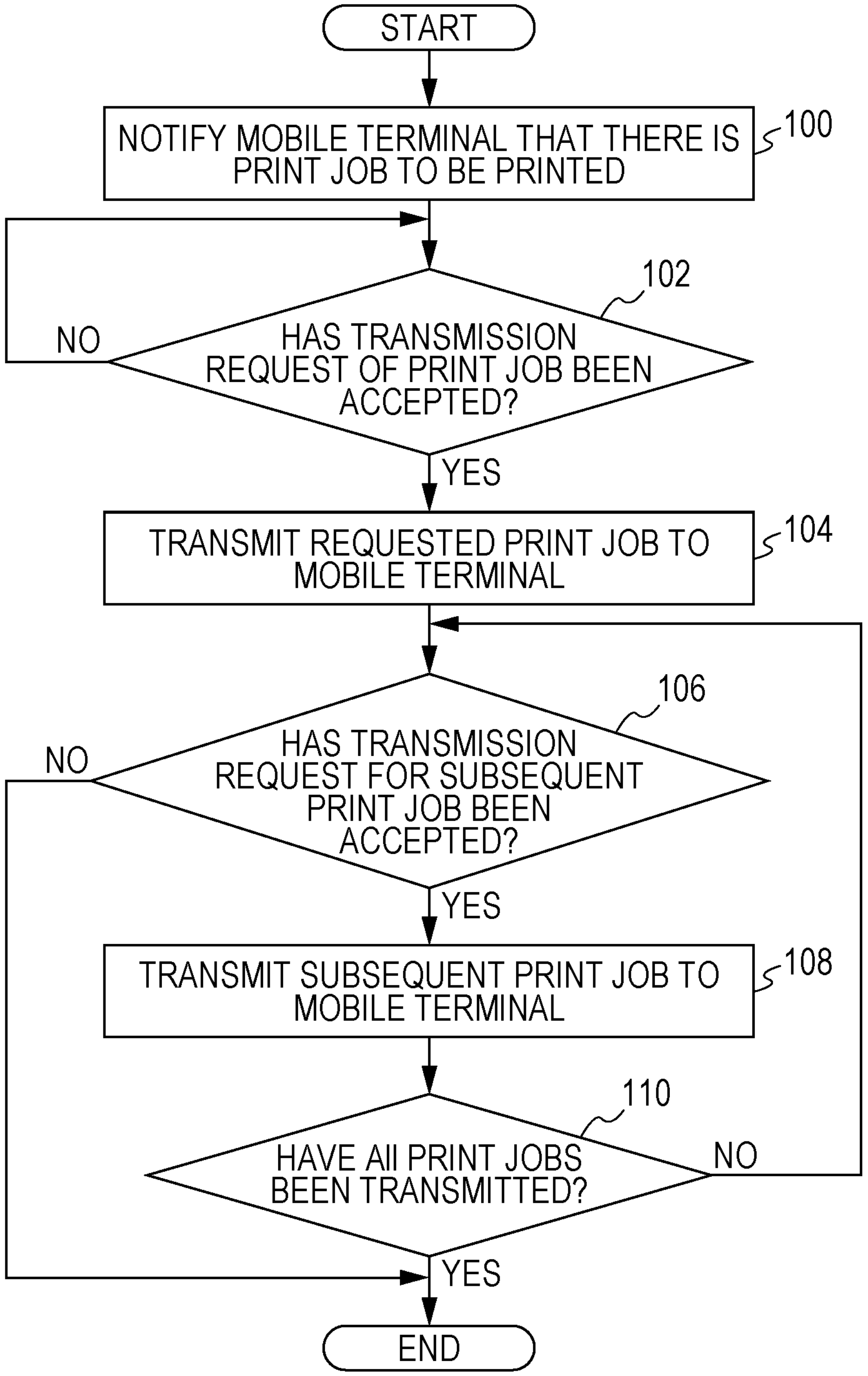
FIG. 6 is a flowchart illustrating an example of a flow of processing performed in the cloud server of the information processing system according to the exemplary embodiment.

First, processing performed at the cloud server 11 providing the print management system 50 will be described. FIG. 6 is a flowchart illustrating an example of a flow of processing performed in the cloud server 11 of the information processing system 10 according to the exemplary embodiment. The processing in FIG. 6 starts, for example, when a print job is registered from the mobile terminal 16 or the client computer 14.

In Step 100, the CPU 11A notifies the mobile terminal 16 that there is a print job to be printed, and the processing proceeds to Step 102. For example, in the example of FIG. 5, the mobile terminal 16 is notified that there are print jobs ABC.

In Step 102, it is determined whether the CPU 11A has accepted a transmission request for a print job from the mobile terminal 16. In this determination, for example, in the example of FIG. 5, it is determined whether a transmission request for the print jobs AB has been accepted from the mobile terminal 16. The processing waits until the determination is affirmative and proceeds to Step 104.

In Step 104, the CPU 11A transmits the requested print job to the mobile terminal 16, and the processing proceeds to Step 106. For example, in the example of FIG. 5, the print jobs AB are transmitted to the mobile terminal 16.

In Step 106, it is determined whether the CPU 11A has accepted a transmission request for a subsequent print job from the mobile terminal 16. In this determination, for example, in the example of FIG. 5, it is determined whether the transmission request for the print job C has been accepted from the mobile terminal 16. In a case where the determination is affirmative, the processing proceeds to Step 108, and in a case where there is no subsequent print job and the determination is negative, the series of processing ends.

In Step 108, the CPU 11A transmits a subsequent print job to the mobile terminal 16, and the processing proceeds to Step 110. For example, in the example of FIG. 5, the print job C is transmitted to the mobile terminal 16.

In Step 110, the CPU 11A determines whether all the print jobs have been transmitted. In a case where the determination is negative, the processing returns to Step 106 and the above-described processing is repeated, and in a case where the determination is affirmative, the series of processing ends.

Figure 7:
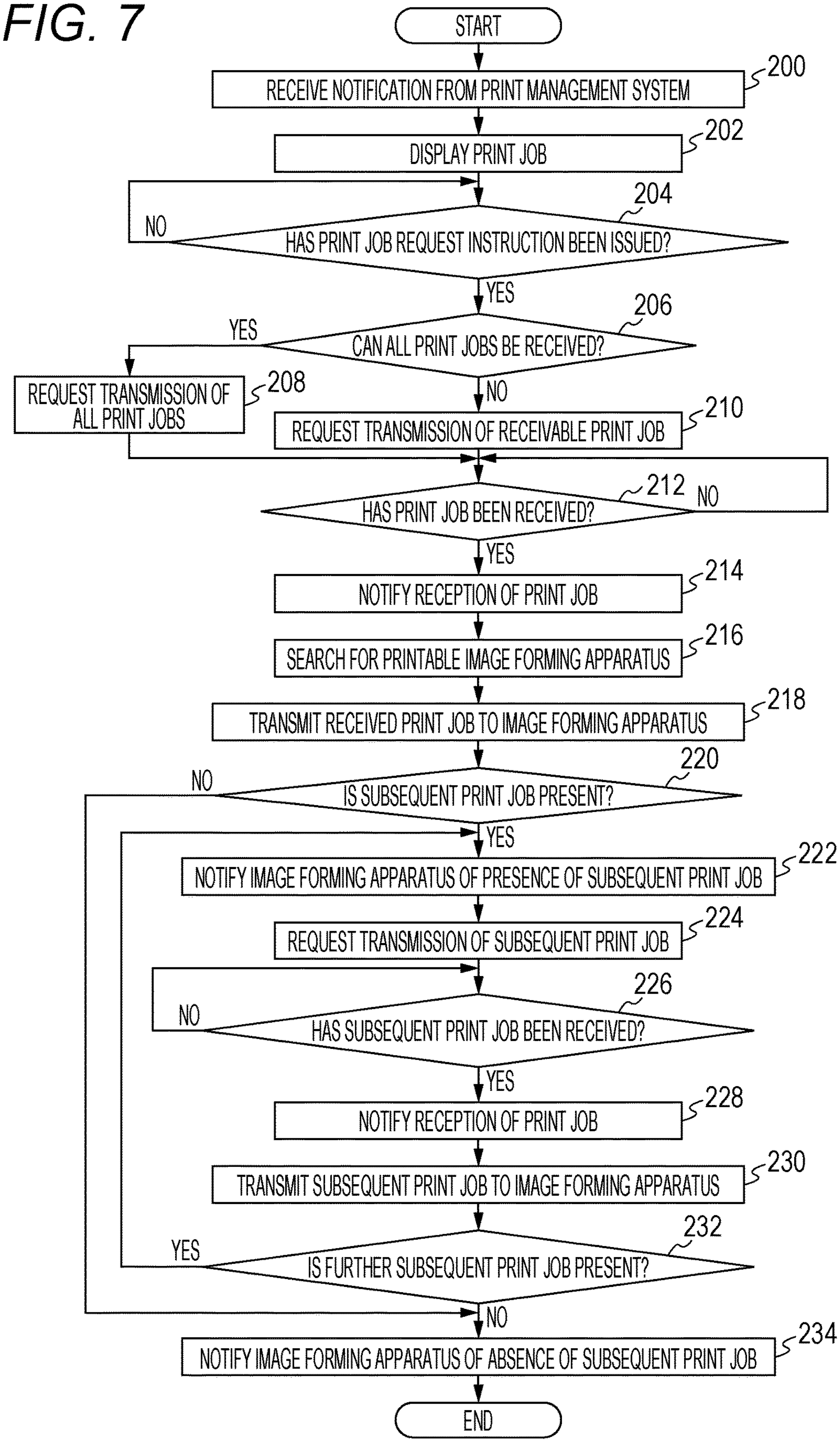
FIG. 7 is a flowchart illustrating an example of a flow of processing performed in the mobile terminal of the information processing system according to the exemplary embodiment.

Subsequently, processing performed in the mobile terminal 16 will be described. FIG. 7 is a flowchart illustrating an example of a flow of processing performed in the mobile terminal 16 of the information processing system 10 according to the exemplary embodiment. The processing of FIG. 7 starts, for example, when it is notified by the cloud server 11 in Step 100 described above that there is a print job.

In Step 200, the CPU 16A receives a notification from the print management system 50, and the processing proceeds to Step 202.

In Step 202, the CPU 16A displays a print job, and the processing proceeds to Step 204. That is, the print job notified from the print management system 50 is displayed on a display unit 16F.

In Step 204, the CPU 16A determines whether a request instruction for a print job has been issued. The determination is performed, for example, by determining whether an operation unit 16E has been operated to give an instruction to request a print job. The processing waits until the determination is affirmative and then proceeds to Step 206.

In Step 206, it is determined whether the CPU 16A can receive all the requested print jobs. In this determination, it is determined whether there is a space for receiving all the print jobs. When the determination is affirmative, the processing proceeds to Step 208, and when the determination is negative, the processing proceeds to Step 210.

In Step 208, the CPU 16A requests the print management system 50 to transmit all of the requested print jobs, and the processing proceeds to Step 212.

In Step 210, CPU 16A requests the print management system 50 to transmit receivable print jobs, and the processing proceeds to Step 212.

In Step 212, the CPU 16A determines whether the print job has been received. The processing waits until the determination is affirmative and then proceeds to Step 214.

In Step 214, the CPU 16A notifies that the print job has been received, and the processing proceeds to Step 216. For example, the reception of the print job is notified by displaying the reception of the print job on the display unit 16F. Alternatively, the notification may be given by sound, voice, or the like.

In Step 216, CPU 16A searches for an image forming apparatus 12 that can perform printing, and the processing proceeds to Step 218. For example, the image forming apparatus 12 communicable through short-range wireless communication, such as Wi-Fi Direct, is searched. Here, for simplicity, the description will be given on the assumption that the image forming apparatus 12 that can perform printing is present nearby and a user can approach the image forming apparatus 12 and perform short-range wireless communication.

In Step 218, the CPU 16A transmits the received print job to the image forming apparatus 12, and the processing proceeds to Step 220. That is, the print job received from the print management system 50 and spooled is transmitted to the searched image forming apparatus 12.

In Step 220, the CPU 16A determines whether there is a subsequent print job. In this determination, it is determined whether there is a print job that has not been received at once. When the determination is affirmative, the processing proceeds to Step 222, and when the determination is negative, the processing proceeds to Step 234.

In Step 222, the CPU 16A notifies the image forming apparatus 12 of the presence of a subsequent print job, and the processing proceeds to Step 224.

In Step 224, the CPU 16A requests the print management system 50 to transmit the subsequent print job, and the processing proceeds to Step 226.

In Step 226, the CPU 16A determines whether the subsequent print job has been received. The processing waits until the determination is affirmative and then proceeds to Step 228.

In Step 228, the CPU 16A provides a notification that the print job has been received, and the processing proceeds to Step 230. For example, the reception of the print job is notified by displaying the reception of the subsequent print job on the display unit 16F. Alternatively, the notification may be given by sound, voice, or the like.

In Step 230, the CPU 16A transmits the subsequent print job to the image forming apparatus 12, and the processing proceeds to Step 232.

In Step 232, the CPU 16A determines whether there is a further subsequent print job. In a case where the determination is affirmative, the processing returns to Step 222 and the above-described processing is repeated, and in a case where the determination is negative, the processing proceeds to Step 234.

In Step 234, the CPU 16A notifies the image forming apparatus 12 that there is no subsequent print job and ends the series of processing.

Figure 8:
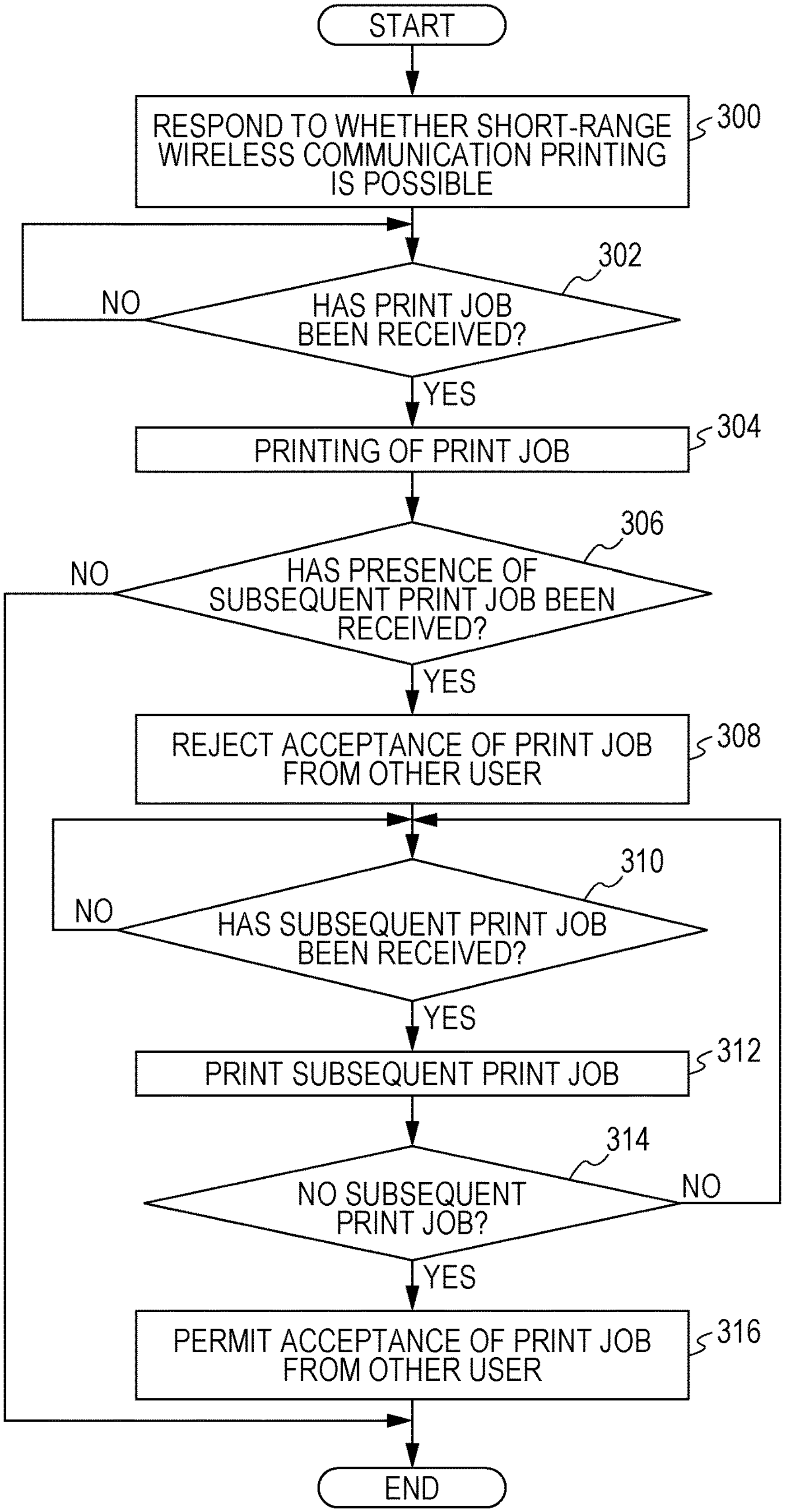
FIG. 8 is a flowchart illustrating an example of a flow of processing performed in the image forming apparatus of the information processing system according to the exemplary embodiment.

Next, processing performed in the image forming apparatus 12 will be described. FIG. 8 is a flowchart illustrating an example of a flow of processing performed in the image forming apparatus 12 of the information processing system 10 according to the exemplary embodiment. The processing of FIG. 8 starts, for example, when a user carrying the mobile terminal 16 approaches the image forming apparatus 12 and short-range wireless communication with the mobile terminal 16 is established.

In Step 300, the CPU 20A responds to the mobile terminal 16 as to whether short-range wireless communication printing is possible, and processing proceeds to Step 302. For example, a response is made as to whether Wi-Fi Direct printing in which printing with Wi-Fi Direct is directly requested is possible.

In Step 302, the CPU 20A determines whether a print job has been received. The determination is to determine whether the print job transmitted from the mobile terminal 16 in Step 218 has been received. The processing waits until the determination is affirmative and then proceeds to Step 304.

In Step 304, the CPU 20A performs printing of the print job, and the processing proceeds to Step 306. That is, the image forming apparatus 12 performs printing by forming an image on a sheet based on the print job.

In Step 306, it is determined whether the CPU 20A has received the presence of a subsequent print job. The determination is to determine whether the presence of a subsequent print job has been notified from the mobile terminal 16 in Step 222. In a case where the determination is affirmative, the processing proceeds to Step 308, and in a case where it is notified in Step 234 that there is no subsequent print job, the determination is negative and the series of processing ends as it is.

In Step 308, CPU 20A rejects acceptance of a print job from another user, and the processing proceeds to Step 310. That is, until the printing of the subsequent print job is completed, the print request from another user is rejected and the image forming apparatus 12 is occupied.

In Step 310, the CPU 20A determines whether a subsequent print job has been received. The processing waits until the determination is affirmative and then proceeds to Step 312. When a subsequent print job is not received even after a predetermined time has elapsed, a timeout may occur, and the processing may proceed to Step 316 to accept a print request from another user.

In Step 312, the CPU 20A performs printing of a subsequent print job, and the processing proceeds to Step 314. That is, the image forming apparatus 12 performs printing by forming an image on a sheet based on the subsequent print job.

In Step 314, CPU 20A determines whether there is no subsequent print job. The determination is to determine whether the absence of a subsequent print job has been notified from the mobile terminal 16 in Step 234. In a case where the presence of a subsequent print job is notified in Step 222, the determination is negative and the processing returns to Step 310 to repeat the above-described processing, and in a case where the determination is affirmative, the processing proceeds to Step 316.

In Step 316, CPU 20A permits acceptance of a print job from another user and ends the series of processing.

Figure 9:
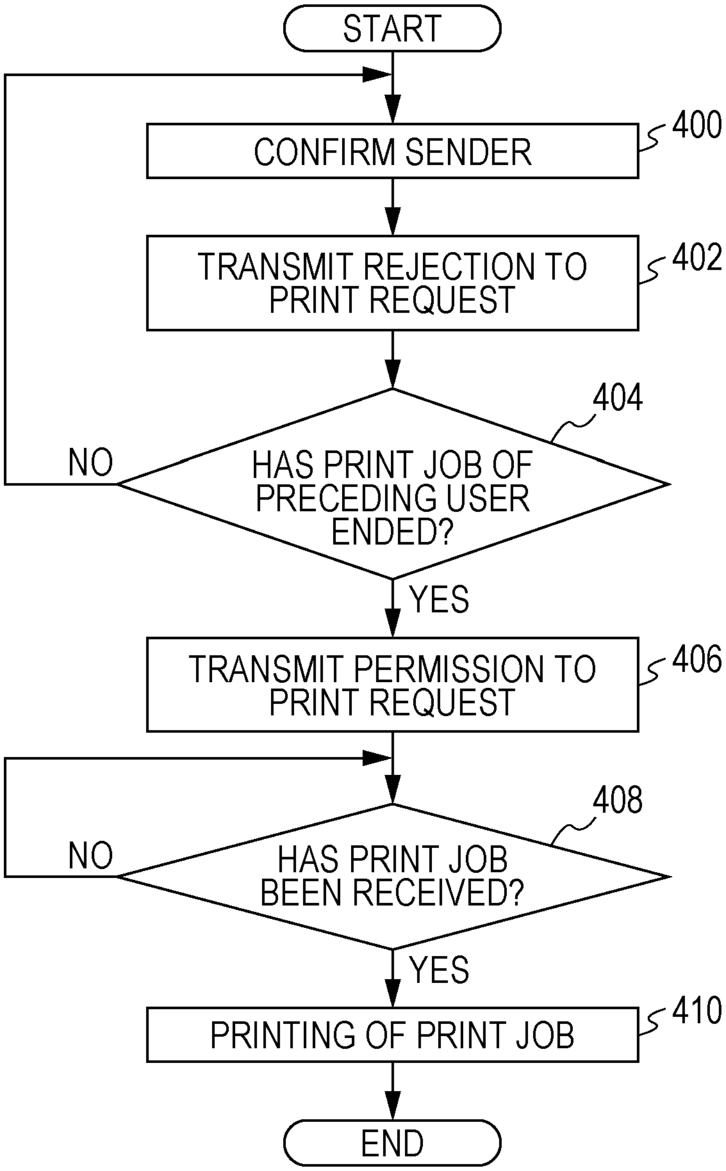
FIG. 9 is a flowchart illustrating an example of a flow of processing performed in the image forming apparatus of the information processing system according to the exemplary embodiment when another user has requested printing of a print job while a certain user is performing printing of a print job.

Next, processing performed in the image forming apparatus 12 when printing of a print job is requested from another user while printing of a print job is being performed by a certain user will be described. FIG. 9 is a flowchart illustrating an example of a flow of processing performed in the image forming apparatus 12 of the information processing system 10 according to the exemplary embodiment when another user has requested printing of a print job while a certain user is performing printing of a print job. The processing of FIG. 9 starts, for example, when a print request of a print job of another user is received while printing of a print job is performed by a certain user.

In Step 400, the CPU 20A checks the sender of the print request, and the processing proceeds to Step 402. For example, the identification information or the like of the hardware is checked, and the mobile terminal 16 that has instructed printing through short-range wireless communication such as Wi-Fi Direct and the other clients are determined.

In Step 402, the CPU 20A transmits a rejection for the print request, and the processing proceeds to Step 404. For example, a NACK signal is transmitted as a rejection signal in response to the print request.

In Step 404, the CPU 20A determines whether Printing of the print job of the preceding user is completed. In a case where the determination is negative, the processing returns to Step 400 and the above-described processing is repeated, and in a case where the determination is affirmative, the processing proceeds to Step 406.

In Step 406, the CPU 20A transmits a permission for the print request, and the processing proceeds to Step 408. For example, an ACK signal is transmitted as a permission signal in response to the print request.

In Step 408, the CPU 20A determines whether a print job has been received. The processing waits until the determination is affirmative and then proceeds to Step 410.

In Step 410, the CPU 20A performs printing of the print job and ends the series of processing. That is, mixing of the printed matter of the preceding user and the printed matter of another user is prevented by completing printing of the print job of the preceding user then performing printing of the other user.

Figure 10:
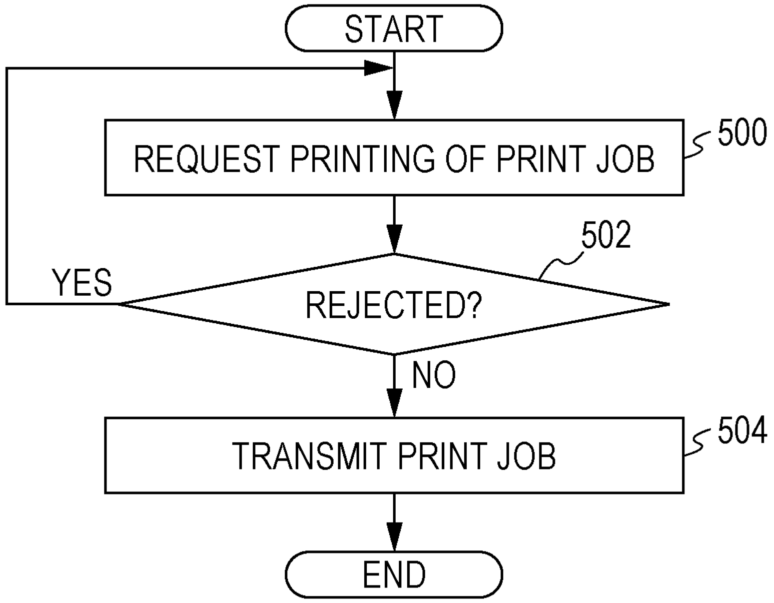
FIG. 10 is a flowchart illustrating an example of a flow of processing performed in a mobile terminal or a client computer of another user in the case of requesting printing to the image forming apparatus when printing of a print job is being performed by a certain user in the image forming apparatus of the information processing system according to the exemplary embodiment.

Next, processing performed in the mobile terminal 16 or the client computer 14 of another user in the case of requesting printing to the image forming apparatus 12 when printing of a print job is being performed by a certain user will be described. FIG. 10 is a flowchart illustrating an example of a flow of processing performed in the mobile terminal 16 or the client computer 14 of another user in the case of requesting printing to the image forming apparatus 12 when printing of a print job is being performed by a certain user in the image forming apparatus 12 of the information processing system according to the exemplary embodiment. The processing of FIG. 10 starts when, while printing of a print job is being performed by a certain user, another user operates the mobile terminal 16 or the client computer 14 to provide a print instruction. Hereinafter, as an example, processing performed at the mobile terminal 16 will be described.

In Step 500, the CPU 16A requests the image forming apparatus 12 to print the print job, and the processing proceeds to Step 502.

In Step 502, it is determined whether the CPU 16A has been rejected. In this determination, it is determined whether a rejection to the print request has been received in Step 402 described above. When the determination is affirmative, the processing returns to Step 500 and the above-described processing is repeated. When the permission for the print request has been received and the determination is negative, the processing proceeds to Step 504.

In Step 504, the CPU 16A transmits the print job to the image forming apparatus 12, and the series of processing ends. This causes the image forming apparatus 12 to perform printing of the print job of the user.

Figure 11:
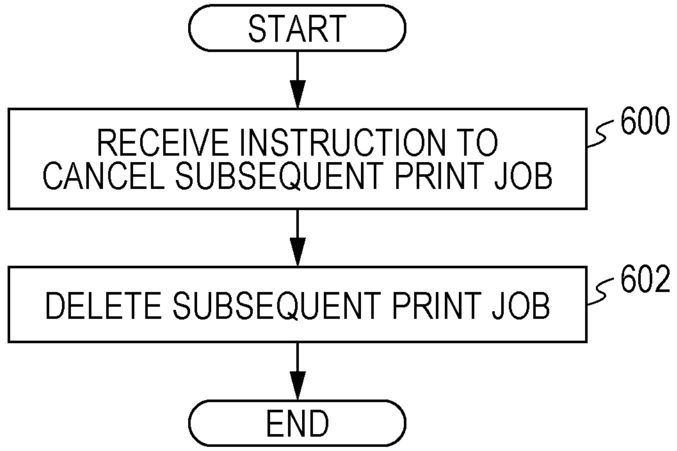
FIG. 11 is a flowchart illustrating an example of a flow of processing performed when a subsequent print job is canceled while a preceding print job is being received and printed in the image forming apparatus of the information processing system according to the exemplary embodiment.

Subsequently, processing performed in the image forming apparatus 12 when a subsequent print job is cancelled while a preceding print job is being received and printed will be described. FIG. 11 is a flowchart illustrating an example of a flow of processing performed when a subsequent print job is canceled while a preceding print job is being received and printed in the image forming apparatus 12 of the information processing system 10 according to the exemplary embodiment. The processing of FIG. 11 starts when an instruction to cancel a subsequent print job transmitted from the mobile terminal 16 is detected while a preceding print job is being received and printed.

In Step 600, the CPU 20A receives a cancellation instruction for the subsequent print job, and the processing proceeds to Step 602.

In Step 602, the CPU 20A deletes the subsequent print job and ends the series of processing. This allows a print request from another user to be satisfied.

In the above-described exemplary embodiment, an example has been described in which when a print job is spooled in the mobile terminal 16, the print job is received using short-range wireless communication, but the present invention is not limited to this configuration. For example, a print job may be received via a mobile phone network.

In the above-described exemplary embodiment, the processor refers to a processor in a broad sense and includes general-purpose processors (for example, CPU or the like) and dedicated processors (for example, GPU: Graphics Processing Unit, ASIC: Application Specific Integrated Circuit, FPGA: Field Programmable Gate Array, programmable logic devices, or the like).

The operation of the processor in the above-described exemplary embodiment may be performed not only by one processor but also by a plurality of processors that are present at physically distant positions in cooperation with each other. The order of the respective operations of the processor is not limited to only the order described in each exemplary embodiment described above but may be appropriately changed.

The "system" according to the exemplary embodiment has been described as being constituted by a plurality of apparatuses as an example. However, the "system" may be constituted by a single apparatus having some functions of the plurality of apparatuses.

The processing performed by the information processing system 10 according to the above-described exemplary embodiment may be processing performed by software, processing performed by hardware, or processing combining both. The processing performed by each unit of the information processing system 10 may be stored as a program in a storage medium for distribution.

The present disclosure is not limited to the above description, and it is needless to say that the present disclosure can be variously modified and implemented within a range not departing from the gist thereof.

With respect to the above-described exemplary embodiment, the following supplementary notes are further disclosed.

((1)) An information processing system comprising a processor, wherein the processor performs processing of:

receiving a print request including print information of a print target from an information processing apparatus that has acquired the print request from a print management system; and rejecting acceptance of the print request from another user when a notification indicating that there is the print request that is a subsequent print request that has not been received from the print management system is received from the information processing apparatus.

((2)) The information processing system according to ((1)), wherein the processor receives, from the information processing apparatus that has acquired the print request including print information of a print target from the print management system using predetermined first communication, the print request using second communication different from the first communication.

((3)) The information processing system according to ((2)), wherein the second communication uses short-range wireless communication of directly communicating with the information processing apparatus.

((4)) The information processing system according to any one of ((1)) to ((3)), wherein the processor continues to reject acceptance of the print request from another user until printing of the print information of the subsequent print request is completed or cancelled.

((5)) The information processing system according to ((4)), wherein when the notification is received, the processor continues to transmit a rejection signal in response to a print request from another user, and transmits an acceptance permission signal to the other user after printing of the print information of the subsequent print request is completed or cancelled.

((6)) The information processing system according to any one of ((1)) to ((5)), wherein when the print information of the subsequent print request has not been received even after a predetermined time has elapsed, the processor accepts a print request from another user.

((7)) A non-transitory computer-readable storage medium storing an information processing program for causing a computer to execute processing of:

receiving a print request including print information of a print target from an information processing apparatus that has acquired the print request from a print management system; and rejecting acceptance of the print request from another user when a notification indicating that there is the print request that is a subsequent print request that has not been received from the print management system is received from the information processing apparatus.

What is claimed is:

1. An information processing system comprising a processor, wherein the processor performs processing of:

receiving, from an information processing apparatus, a print request including print information of a print target, the print request having been acquired by the information processing apparatus from a print management system;

receiving, from the information processing apparatus, a notification indicating that a subsequent print request remains to be acquired print management system; and in response to receiving the notification, rejecting acceptance of a print request from another user, and continuing to reject acceptance of the print request from the other user until printing of print information of the subsequent print request is completed or canceled.

2. The information processing system according to claim 1, wherein the processor receives, from the information processing apparatus that has acquired the print request including print information of the print target from the print management system using a predetermined first communication, the print request using a second communication different from the first communication.

3. The information processing system according to claim 2, wherein the second communication uses wireless communication of directly communicating with the information processing apparatus.

4. The information processing system according to claim 1, wherein when the notification is received, the processor continues to transmit a rejection signal in response to a print request from another user, and transmits an acceptance permission signal to the other user after printing of the print information of the subsequent print request is completed or canceled.

5. The information processing system according to claim 1, wherein when the print information of the subsequent print request has not been received even after a predetermined time has elapsed, the processor accepts a print request from another user.

6. A non-transitory computer-readable storage medium storing an information processing program for causing a computer to execute processing of:

receiving, from an information processing apparatus, a print request including print information of a print target, the print request having been acquired by the information processing apparatus from a print management system;

receiving, from the information processing apparatus a notification indicating that a subsequent print request remains to be acquired from the print management system; and in response to receiving the notification, rejecting acceptance of a print request from another user, and continuing to reject acceptance of the print request from the other user until printing of print information of the subsequent print request is completed or canceled.

* * * * *